United States Patent
Choi et al.

(10) Patent No.: US 9,338,317 B2
(45) Date of Patent: May 10, 2016

(54) METHOD AND APPARATUS FOR PERFORMING FUNCTION ACCORDING TO POSITION OF SCAN OBJECT

(71) Applicant: SAMSUNG ELECTRONICS CO., LTD., Suwon-si (KR)

(72) Inventors: Chi-ho Choi, Seoul (KR); Young-kook Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 25 days.

(21) Appl. No.: 14/037,744

(22) Filed: Sep. 26, 2013

(65) Prior Publication Data

US 2014/0285859 A1    Sep. 25, 2014

(30) Foreign Application Priority Data

Mar. 25, 2013 (KR) .................. 10-2013-0031703

(51) Int. Cl.
  *H04N 1/04* (2006.01)
  *H04N 1/00* (2006.01)
  *H04N 1/10* (2006.01)

(52) U.S. Cl.
  CPC ....... *H04N 1/00687* (2013.01); *H04N 1/00689* (2013.01); *H04N 1/00694* (2013.01); *H04N 1/00753* (2013.01); *H04N 1/00779* (2013.01); *H04N 1/00822* (2013.01); *H04N 1/00915* (2013.01); *H04N 1/10* (2013.01); *H04N 1/1013* (2013.01); *H04N 2201/0081* (2013.01);
  (Continued)

(58) Field of Classification Search
  CPC .......... H04N 1/00687; H04N 1/00689; H04N 1/00694; H04N 1/00753; H04N 1/00779; H04N 1/00822; H04N 1/00915

USPC .......... 358/488, 486, 497, 474; 382/312, 318, 382/319
  See application file for complete search history.

(56) References Cited

U.S. PATENT DOCUMENTS 6,169,612 B1 * 1/2001 Deguchi ..................... 358/488
6,937,369 B2 * 8/2005 Shih et al. .................. 358/486
(Continued)

FOREIGN PATENT DOCUMENTS

KR    10-2011-0071704    6/2011

OTHER PUBLICATIONS

International Search Report issued Feb. 21, 2014 in corresponding International Patent Application PCT/KR2013/010480.
(Continued)

*Primary Examiner* — Cheukfan Lee
(74) *Attorney, Agent, or Firm* — Staas & Halsey LLP

(57) ABSTRACT

An image forming apparatus includes a user interface unit that includes a scan area, an image reading unit that reads an image of a scan object disposed on the scan area, a driving unit that moves the image reading unit, a control unit that controls a function according to a position of the scan object, an operation performing unit that performs the function by using the read image, and a storage unit that stores information about the function corresponding to the position of the scan object. The scan area includes a determination area and a function area, and when it is determined that the scan object does not exist on the determination area, the control unit controls the operation performing unit to perform the function corresponding to the position of the scan object on the function area.

25 Claims, 8 Drawing Sheets

(52) U.S. Cl.
CPC *H04N2201/0094* (2013.01); *H04N 2201/0466* (2013.01)

(56) References Cited

U.S. PATENT DOCUMENTS

| | | | |
|---|---|---|---|
| 7,420,717 B2 * | 9/2008 | Park | 358/474 |
| 2004/0061875 A1 | 4/2004 | Joo | |
| 2005/0111894 A1 | 5/2005 | Hosoi | |
| 2005/0286080 A1 | 12/2005 | Lee et al. | |
| 2008/0225352 A1 | 9/2008 | Narukawa | |
| 2009/0002780 A1 | 1/2009 | Kang et al. | |
| 2009/0015883 A1 | 1/2009 | Kim | |
| 2011/0075199 A1 | 3/2011 | Jung et al. | |
| 2011/0149306 A1 | 6/2011 | Kim | |
| 2012/0147401 A1 | 6/2012 | Poh et al. | |

OTHER PUBLICATIONS

Extended European Search Report mailed Jul. 16, 2014 in related European Application No. 14155192.9.

* cited by examiner

METHOD AND APPARATUS FOR PERFORMING FUNCTION ACCORDING TO POSITION OF SCAN OBJECT

CROSS-REFERENCE TO RELATED APPLICATIONS

This application claims the priority benefit of Korean Patent Application No. 10-2013-0031703, filed on Mar. 25, 2013, in the Korean Intellectual Property Office, the disclosure of which is incorporated herein in its entirety by reference.

BACKGROUND

1. Field

The following description relates to an image forming apparatus having a scanning function, and more particularly, to a method of performing a scanning function according to a position of a scan object.

2. Description of the Related Art

Multifunction printers generally support a scanning function, a printing function, and a faxing function. Accordingly, a multifunction printer may perform various functions of scanning a document to obtain a scan image, printing the scan image, and transmitting the scan image via a facsimile machine, and further e-mailing the scan image and transmitting the scan image or transmitting the scan image to a mobile phone.

However, in order to perform various functions such as enlarging and outputting a scan image or e-mailing the scan image, a peripheral device such as a personal computer (PC) may be connected to a multifunction printer and a user may directly handle by using an application program, thereby reducing user convenience.

SUMMARY

Additional aspects and/or advantages will be set forth in part in the description which follows and, in part, will be apparent from the description, or may be learned by practice of the disclosure.

The present disclosure provides a method and an image processing apparatus for determining a position of a scan object and performing a function corresponding to the determined position.

According to an aspect of the present disclosure, there is provided an image forming apparatus including: a user interface unit that includes a scan area on which a scan object is disposed; an image reading unit that reads an image of the scan object disposed on the scan area; a driving unit that moves the image reading unit on the scan area; an operation performing unit that performs an operation by using the image read by the image reading unit; and a control unit that controls the operation to be performed according to a position of the scan object on the scan area, wherein the scan area includes a determination area and a function area, and the control unit determines whether the scan object exists on the determination area, and when it is determined that the scan object exists on the determination area, controls the operation performing unit to, store or print the read image and when it is determined that the scan object does not exist on the determination area, perform a function which is preset according to a position of the scan object on the function area.

The control unit may include: a position determining unit that determines a position of the scan object on the function area; and a function selecting unit that selects a function corresponding to the determined position.

The determination area may extend from a first position to a second position on the scan area, and the function area may extend from the second position to a third position on the scan area, wherein the control unit determines whether the scan object exists on the determination area by controlling the driving unit to move the image reading unit from the first position to the second position and, when it is determined that the scan object does not exist, the control unit determines a position of the scan object on the function area by controlling the driving unit to move the image reading unit from the third position to the second position.

According to another aspect of the present disclosure, there is provided a method of performing a function according to a position of a scan object, the method including: determining whether the scan object exists on a determination area of a scan area; when it is determined that the scan object exists on the determination area, reading and storing or printing an image of the scan object, and when it is determined that the scan object does not exist on the determination area, determining a position of the scan object on a function area of the scan area; and performing a function which is preset according to the determined position on the function area.

The determination area may extend from a first position to a second position on the scan area, and the function area may extends from the second position to a third position on the scan area, wherein the determining whether the scan object exists on the determination area includes determining whether the scan object exists on the determination area by moving an image reading unit from the first position to the second position, wherein the determining of the position of the scan object includes determining the position of the scan object on the function area by moving the image reading unit from the third position to the second position.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

The present disclosure will now be described more fully with reference to the accompanying drawings, in which exemplary embodiments of the disclosure are shown. In the following description of the present disclosure, a detailed description of known functions and configurations incorporated herein will be omitted when it may make the subject matter of the present disclosure unclear.

Figure 1:
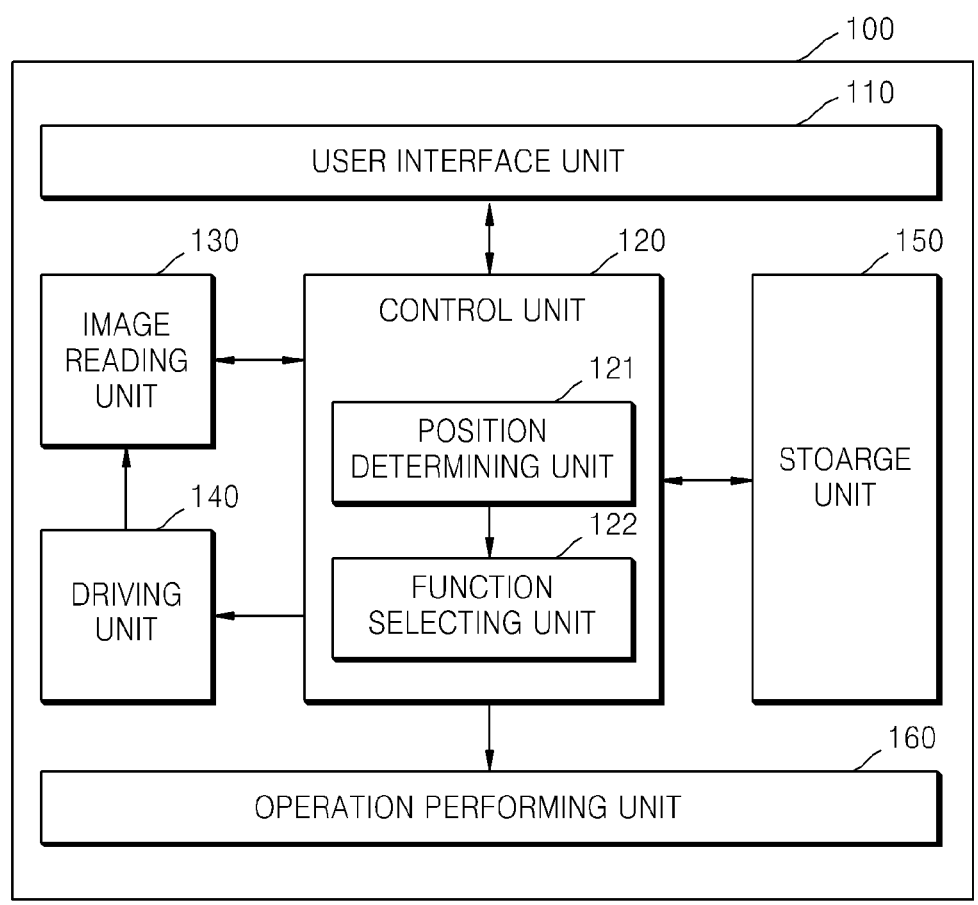
FIG. 1 is a block diagram illustrating an image forming apparatus according to an embodiment of the present disclosure.

FIG. 1 is a block diagram illustrating an image forming apparatus 100 according to an embodiment of the present disclosure. The image forming apparatus 100 may be, for example, a multifunction printer having a scanning function and a printing function. Accordingly, the image forming apparatus 100 may perform a function of outputting a scan image or transmitting the scan image to the outside through a wired, wireless, or wired-wireless network.

Referring to FIG. 1, the image forming apparatus 100 may include a user interface unit 110, a control unit 120, an image reading unit 130, a driving unit 140, a storage unit 150, and an operation performing unit 160. The control unit 120 may include a position determining unit 121 and a function selecting unit 122.

The user interface unit 110 may receive commands related to an image forming operation from a user, and may include a scan area on which a scan object is disposed. When the scan object exists on the scan area, a function according to a position of the scan object on the scan area may be performed. Further, the scan area may include a determination area and a function area. When the scan object does not exist on the determination area, a function according to a position of the scan object on the function area may be performed. A detailed structure of the scan area will be described below with reference to FIG. 2.

The image reading unit 130 to read an image of the scan object disposed on the scan area may be a module including a light source that emits light to the scan object and an image sensor that converts an optical signal reflected from the scan object into an electrical signal. In this case, the image sensor may be, for example, a contact image sensor (CIS). The CIS outputs an electrical signal corresponding to an image read from the scan area. When the scan object does not exist on the scan area, since the CIS converts an optical signal reflected from a white cover covering the scan area into an electrical signal, the CIS outputs a voltage corresponding to a white level. When the CIS is turned off or a cover of the scan area is opened, the CIS outputs a voltage corresponding to a black level. When an electrical signal output from the CIS has a value between a white level and a black level, the scan object exists on the scan area. Accordingly, it may be determined whether the scan object exists on the scan area by analyzing an electrical signal output from the CIS, and a position of the scan object may also be determined. An output signal of the CIS is transmitted to the control unit 120 and is used to determine a position of the scan object.

The driving unit 140 may move the image reading unit 130 on the scan area so as for the image reading unit 130 to read an image from the scan area. The driving unit 140 may be a driving motor that drives the image reading unit 130 under the control of the control unit 120.

Information about a function corresponding to a position of the scan object on the function area may be stored in the storage unit 150. For example, information indicating that functions of enlarging and outputting an image read from the scan object, e-mailing an image file of an image read from the scan object, or transmitting the image file to a mobile phone are performed according to a position of the scan object on the function area may be stored. The information may be preset when a product is manufactured and may be modified, changed, or customized by the user. Accordingly, functions which are frequently used may be generally preset when a product is manufactured, and may be set according to a user's individual use pattern.

The operation performing unit 160 performs an image forming operation using an image read from the image reading unit 130 under the control of the control unit 120.

The control unit 120 controls an electrical signal output from the CIS of the image reading unit 130 to be analyzed and a function according to a position of the scan object on the function area to be performed. In detail, the control unit 120 determines whether a part of the scan object exists on the determination area and when it is determined that a part of the scan object exists on the determination area, controls the operation performing unit 160 to perform a basic function. For example, an operation of printing an image read from the scan object at a ratio of 1:1 may be set as a basic function. That is, when a part of the scan object exists on the determination area, the control unit 120 controls a basic function to be performed irrespective of a position of the other part of the scan object on the function area.

However, when it is determined that the scan object does not exist on the determination area, the control unit 120 controls a position of the scan object on the function area to be determined and a function corresponding to the determined position to be performed. In detail, when the position determining unit 121 determines a position of the scan object on the function area, the function selecting unit 122 selects a function corresponding to the determined position by using information stored in the storage unit 150.

An operation of the image forming apparatus 100 will now be explained in detail with reference to FIG. 2.

Figure 2:
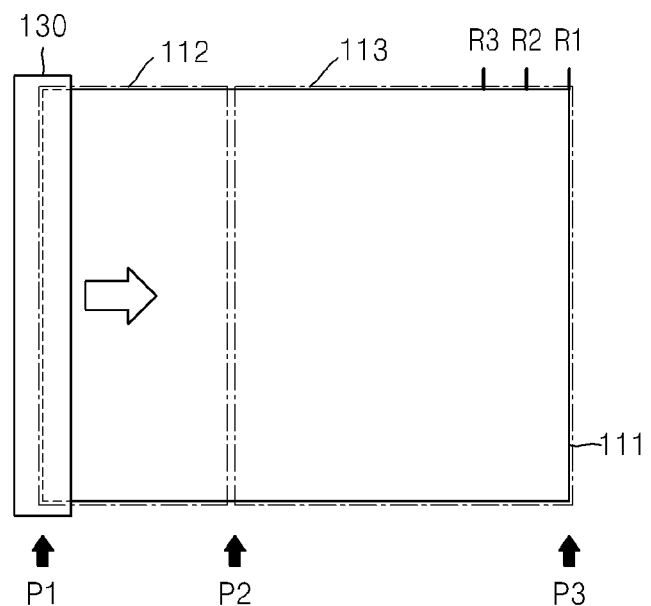
FIG. 2 is a view illustrating a scan area included in a user interface of the image forming apparatus, according to an embodiment of the present disclosure.

FIG. 2 is a view illustrating a scan area 111 included in a user interface of the image forming apparatus 100, according to an embodiment of the present disclosure. Referring to FIG. 2, the scan area 111 on which a scan object is to be disposed includes a determination area 112 and a function area 113. A first reference position R1, a second reference position R2, and a third reference position R3 exist on the function area 113. Although 3 reference positions are set in FIG. 2, the number of reference positions is not limited and more or less reference numerals may be set. Also, in order to display the first through third reference positions R1, R2, and R3, engraving may be made in the product, text may be printed on the product, or a sticker may be attached to the product. It is assumed that one end portion of the scan area 111 is referred to as a first position P1, a portion where the determination area 112 and the function area 113 meet each other is referred to as a second position P2, and the other end portion of the scan area 111 is referred to as a third position P3.

Operations of components of FIG. 1 will be explained with reference to FIGS. 1 and 2. The image reading unit 130 stands by at the first position P1 before a scanning operation starts. Once the scanning operation starts, the control unit 120 controls the driving unit 140 to move the image reading unit 130 from the first position P1 to the second position P2. While the image reading unit 130 is moved from the first position P1 to the second position P2, the control unit 120 determines whether a scan object exists on the determination area 112 by analyzing an electrical signal output from the image reading unit 130. When only a voltage value corresponding to a white level is output while the image reading unit 130 is moved from the first position P1 to the second position P2, the control unit 120 determines that the scan object does not exist on the determination area 112. When a voltage value between a white level and a black level is output, the control unit 120 determines that the scan object exists on the determination area 112.

When it is determined that the scan object exists on the determination area 112, the control unit 120 controls the operation performing unit 160 to perform a basic function which is preset. However, when it is determined that the scan object does not exist on the determination area 112, the position determining unit 121 determines a position of the scan object on the function area 113 by analyzing an electrical signal output while the image reading unit 130 is moved from the second position P2 to the third position P3. The first through third reference positions R1, R2, and R3 which are preset exist on the function area 113. The position determining unit 121 determines whether the scan object is located at any one of the first through third reference positions R1, R2, and R3 which are preset. When the position determining unit 121 determines that the scan object is located at any one of the first through third reference positions R1, R2, and R3 which are preset, the function selecting unit 122 selects a function corresponding to the reference position where the scan object is located at. Information about a function corresponding to each of the first through third reference positions R1, R2, and R3 on the function area 113 is stored in the storage unit 150.

An operation of the image forming apparatus 100 of FIG. 1 will be explained on the assumption that a function of enlarging and outputting a read image is set in the first reference position R1, a function of e-mailing a read image is set in the second reference position R2, and a function of transmitting a read image to a mobile phone is set in the third reference position R3 on the function area 113 of FIG. 2.

Figure 3:
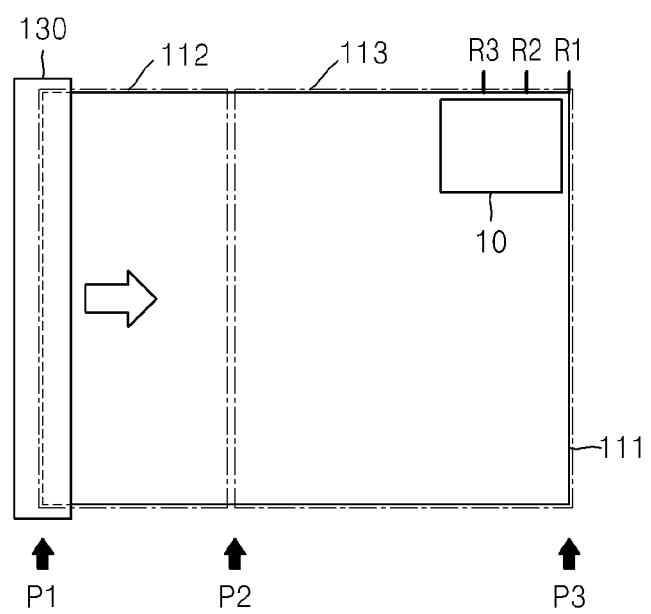
FIG. 3 is a view illustrating a state where a scan object is located at a first reference position.
Figure 4:
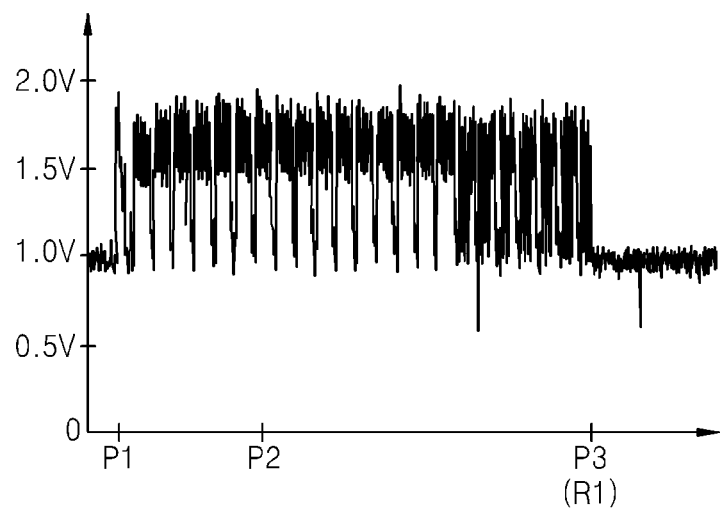
FIG. 4 is a graph illustrating a waveform of an electrical signal output from a contact image sensor (CIS) of an image reading unit when scanning is performed in the state of FIG. 3.

FIG. 3 is a view illustrating a state where a scan object 10 is located at the first reference position R1. FIG. 4 is a graph illustrating a waveform of an electrical signal output from the CIS of the image reading unit 130 when scanning is performed in the state of FIG. 3. FIG. 4 illustrates a waveform of an electrical signal corresponding to a Blue (B) component from Red (R), Green (G), and Blue (B) components of an electrical signal output from the CIS.

Referring to FIG. 3, the scan object 10 is located at the first reference position R1 on the function area 113. The image reading unit 130 performs scanning on the determination area 112 by being moved from the first position P1 to the second position P2. Since the scan object 10 does not exist on the determination area 112, the CIS of the image reading unit 130 outputs only a voltage corresponding to a white level while the determination area 112 is scanned. A waveform of a voltage between the first position P1 and the second position P2 in the graph of FIG. 4 oscillates between 1.5 V and 2.0 V which corresponds to a white level. Accordingly, the control unit 120 determines that the scan object 10 does not exist on the determination area 112 and determines a position of the scan object 10 on the function area 113.

In the graph of FIG. 4, since a waveform at the first position R1 oscillates between 1.0 V and 2.0 V, the scan object 10 is detected. A waveform of an output signal of the CIS of FIG. 4 has, for example, 23 cycles over the entire scan area 111. For example, in FIG. 4, since a waveform of a right first cycle corresponding to the first reference position R1 oscillates between 1.0 V and 2.0 V, the scan object 10 is detected at the first reference position R1.

Accordingly, the position determining unit 121 of the control unit 120 determines that the scan object 10 is located at the first reference position R1 on the function area 113, and the function selecting unit 122 confirms that a function corresponding to the first reference position R1 is a function of enlarging and outputting a read image by using information stored in the storage unit 150, and selects an enlarging and outputting function. Next, the control unit 120 controls the operation performing unit 160 to enlarge and output the read image.

Figure 5:
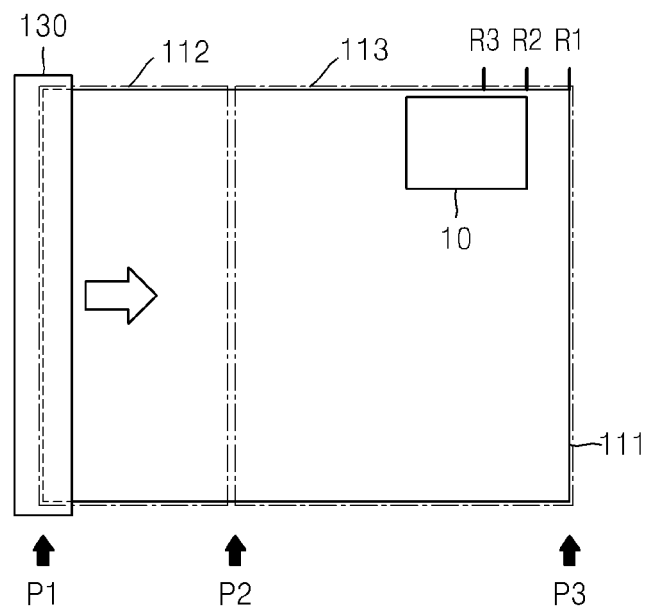
FIG. 5 is a view illustrating a state where the scan object is located at a second reference position.
Figure 6:
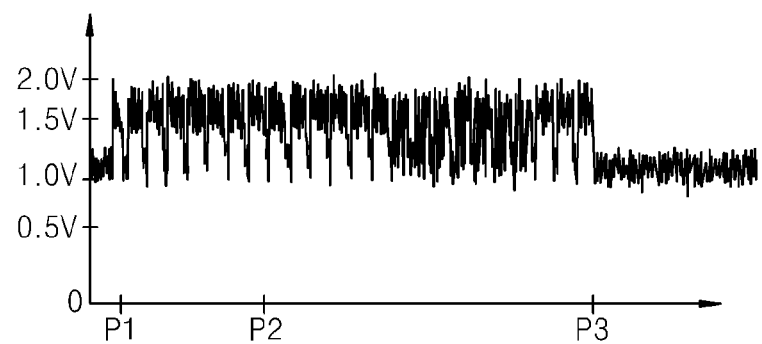
FIG. 6 is a graph illustrating a waveform of an electrical signal output from the CIS of the image reading unit when scanning is performed in the state of FIG. 5.

FIG. 5 is a view illustrating a state where the scan object 10 is located at the second reference position R2. FIG. 6 is a graph illustrating a waveform of an electrical signal output from the CIS of the image reading unit 130 when scanning is performed in the state of FIG. 5. FIG. 6 illustrates a waveform of an electrical signal corresponding to a B component B from among R, G, and B components of an electrical signal output from the CIS.

Referring to FIG. 5, the scan object 10 is located at the second reference position R2 on the function area 113. The image reading unit 130 performs scanning on the determination area 112 by being moved from the first position P1 to the second position P2. Since the scan object 10 does not exist on the determination area 112, the CIS of the image reading unit 130 outputs only a voltage corresponding to a white level while the determination area 112 is scanned. A waveform of a voltage between the first position P1 and the second position P2 in the graph of FIG. 6 oscillates between 1.5 V and 2.0 V, which corresponds to a white level. Accordingly, the control unit 120 determines that the scan object 10 does not exist on the determination area 112, and determines a position of the scan object 10 on the function area 113.

Referring to the graph of FIG. 6, a waveform between the second reference position R2 and the first reference position R1 oscillates between 1.5 V and 2.0 V, which corresponds to a white level. Accordingly, the scan object 10 does not exist at the first reference position R1. Since a waveform at the second reference position R2 oscillates between 1.0 V and 2.0 V, the scan object 10 is detected. That is, a waveform of an output signal of the CIS of FIG. 6 has, for example, 23 cycles over the entire scan area 111. For example, as shown in FIG. 6, since a waveform of a right third cycle corresponding to the second reference position R2 oscillates between 1.0 V and 2.0 V, the scan object 10 is detected at the second reference position R2.

Accordingly, the position determining unit 121 of the control unit 120 determines that the scan object 10 is located at the second reference position R2 on the function 113, and the function selecting unit 122 confirms that a function corresponding to the second reference position R2 is a function of e-mailing a read image by using information stored in the storage unit 150 and selects an e-mailing function. Next, the control unit 120 controls the operation performing unit 160 to e-mail the read image.

Figure 7:
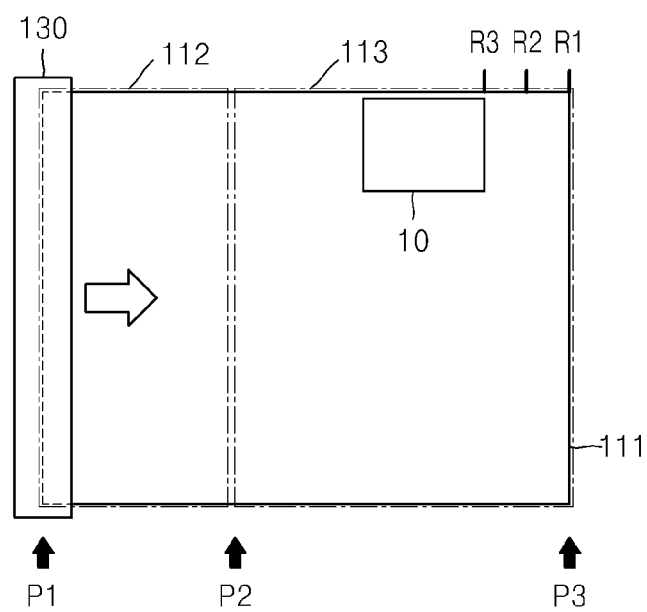
FIG. 7 is a view illustrating a state where the scan object is located at a third reference position.
Figure 8:
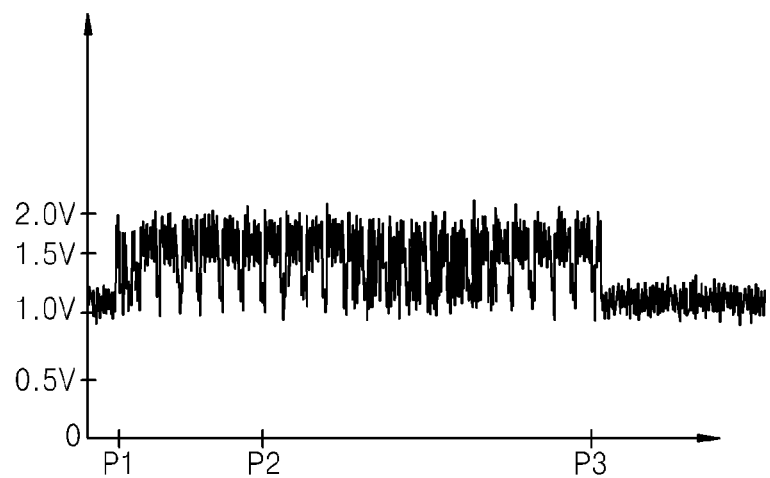
FIG. 8 is a graph illustrating a waveform of an electrical signal output from the CIS of the image reading unit when scanning is performed in the state of FIG. 7.

FIG. 7 is a view illustrating a state where the scan object 10 is located at the third reference position R3. FIG. 8 is a graph illustrating a waveform illustrating an electrical signal output from the CIS of the image reading unit 130 when scanning is performed in the state of FIG. 7. FIG. 8 illustrates a waveform of an electrical signal corresponding to a B component from among R, G, and B components of an electrical signal output from the CIS.

Referring to FIG. 7, the scan object 10 is located at the third reference position R3 on the function area 113. The image reading unit 130 performs scanning on the determination area 112 by being moved from the first position P1 to the second position P2. Since the scan object 10 does not exist on the determination area 112, the CIS of the image reading unit 130 outputs only a voltage corresponding to a white level while the determination area 112 is scanned. A waveform of a voltage between the first position P1 and the second position P2 in the graph of FIG. 8 oscillates between 1.5 V and 2.0 V, which corresponds to a white level. Accordingly, the control unit 120 determines that the scan object 10 does not exist on the determination area 112, and determines a position of the scan object 10 on the function area 113.

Referring to the graph of FIG. 8, a waveform between the third reference position R3 and the first reference position R1 oscillates between 1.5 V and 2.0 V, which corresponds to a white level. Accordingly, the scan object 10 does not exist at the first reference position R1 and the second reference position R2. Since a waveform at the third reference position R3 oscillates between 1.0 V and 2.0 V, the scan object 10 is detected. That is, a waveform of an output signal of the CIS of FIG. 8 has, for example, 23 cycles over the entire scan area 111. For example, as shown in FIG. 8, since a waveform of a right fifth cycle corresponding to the third reference position R3 oscillates between 1.0 V and 2.0 V, the scan object 10 is detected at the third reference position R3.

Accordingly, the position determining unit 121 of the control unit 120 determines that the scan object 10 is located at the third reference position R3 on the function area 113, and the function selecting unit 122 confirms that a function corresponding to the third reference position R3 is a function of transmitting a read image to a mobile phone by using information stored in the storage unit 150 and selects a mobile phone transmission unit. Next, the control unit 120 controls the operation performing unit 160 to transmit the read image to the mobile phone.

Assuming that a width of the scan object 10 is greater than an interval between the first reference position R1 and the third reference position R3 as shown in FIGS. 3 through 8, when the scan object 10 is located at the first reference position R1, the scan object 10 is detected even at the second and third reference positions R2 and R3, and when the scan object 10 is located at the second reference position R2, the scan object 10 is not detected at the first reference position R1 but is detected at the third reference position R3.

Accordingly, in order to accurately determine a position of the scan object 10, a method of sequentially determining a position beginning from the first reference position R1 may be used. In detail, when the scan object 10 is detected at the first reference position R1, it is determined that the scan object 10 is located at the first reference position R1 irrespective of whether the scan object 10 is detected at the second reference position R2 and the third reference position R3. When the scan object is not detected at the first reference position R1, it is determined whether the scan object 10 is detected at the second reference position R2, and when the scan object 10 is detected at the second reference position R2, it is determined that the scan object 10 is located at the second reference position R2 irrespective of whether the scan object 10 is detected at the third reference position R3.

As such, when a scan area is divided into a determination area and a function area and a scan object does not exist on the determination area, a position of the scan object on the function area is determined and a function preset to correspond to the determined position is performed, thereby making it possible to easily perform various functions with simple manipulation.

Figure 9A:
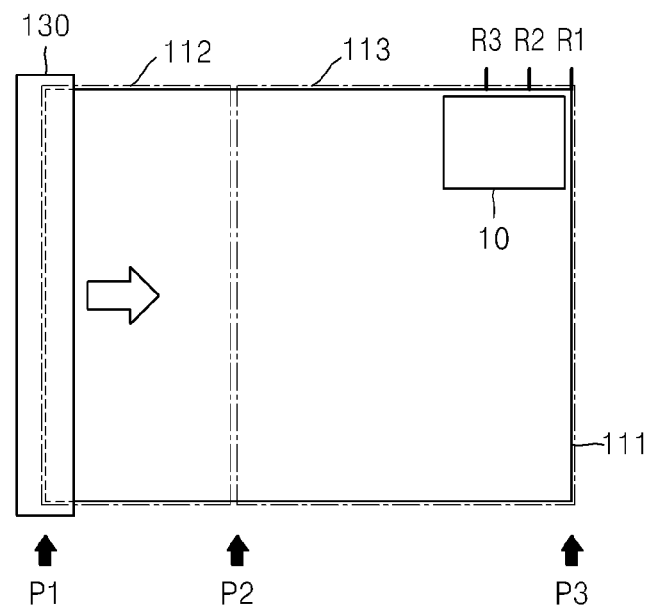
FIGS. 9A through 9C are views for explaining an operation of the image forming apparatus, according to an embodiment of the present disclosure.
Figure 9B:
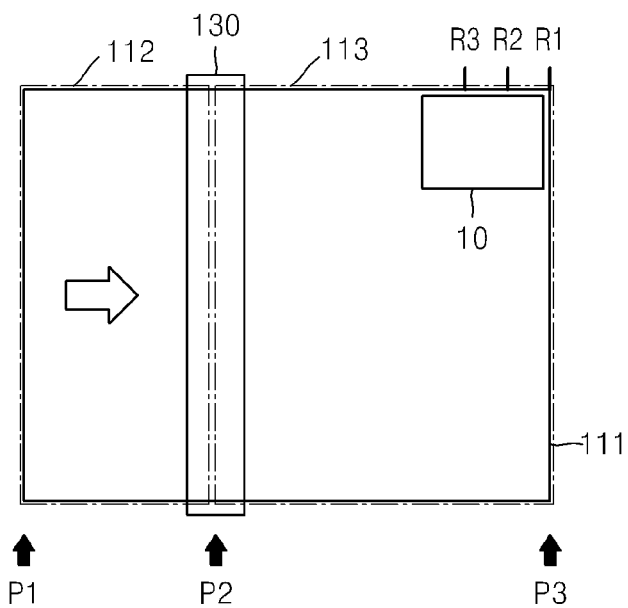
Figure 9C:
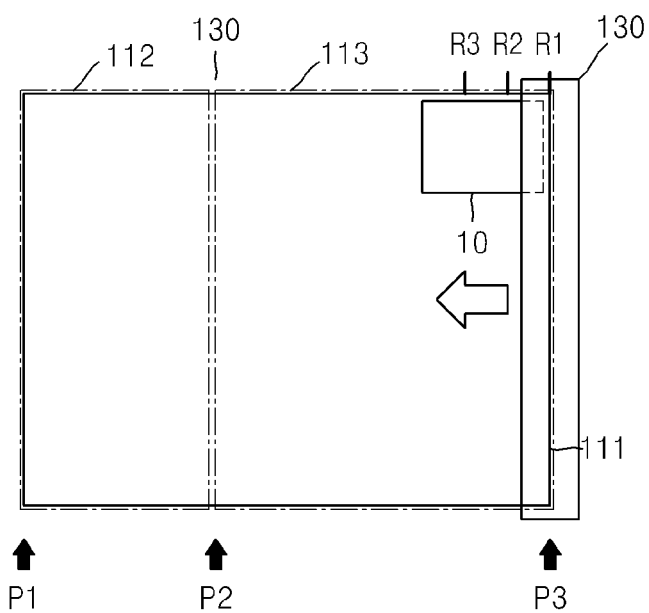

FIGS. 9A through 9C are views for explaining an operation of the image forming apparatus 100, according to an embodiment of the present disclosure. The operation of the image forming apparatus 100 will be explained with reference to FIG. 1 and FIGS. 9A through 9C.

Referring to FIG. 9A, the image reading unit 130 scans the determination area 112 by being moved from the first position P1 to the second position P2. When scanning of the determination area 112 is completed, the image reading unit 130 is located at the second position P2 as shown in FIG. 9B. When the scan object 10 does not exist on the determination area 112, the control unit 120 controls a position of the scan object 10 on the function area 113 to be determined. However, in this case, the control unit 120 moves the image reading unit 130 from the second position P2 to the third position P3 without reading an image of the scan area, for example, by turning off the image reading unit 130, instead of performing scanning while the image reading units 130 is moved from the second position P2 to the third position P3. Next, the control unit 120 turns on the image reading unit 130, and as shown in FIG. 9C, determines that a position of the scan object 10 on the function area 113 is the first reference position R1 by performing scanning by moving the image reading unit 130 from the third position P3 to the second position P2.

In this case, the control unit 120 may reduce an overall operation time by controlling the driving unit 140 to move the image reading unit 130 faster from the second position P2 to the third position P3 by not reading the image of the scan area while moving. For example, by turning off the image reading unit 130 while moving from P2 to P3, the image reading unit 130 may move faster than when the image reading unit 130 is turned on and moves while performing scanning from P2 to P3.

Figure 10:
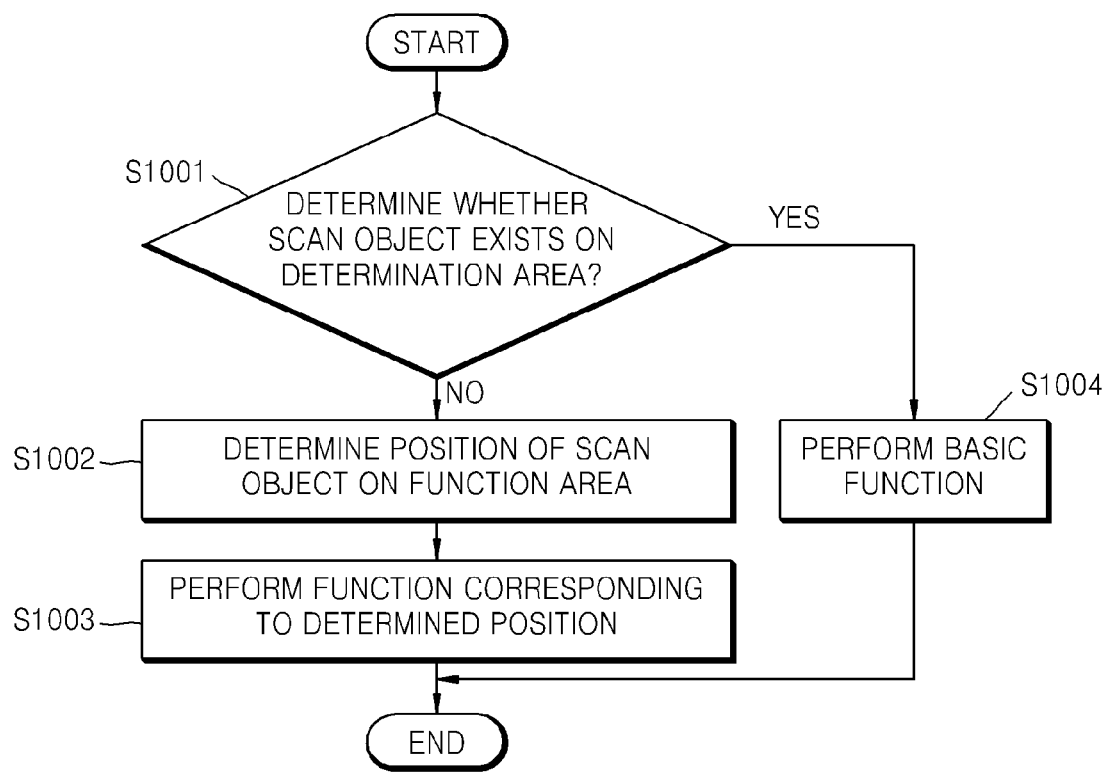
FIGS. 10 and 11 are flowcharts illustrating methods of performing a function according to a position of a scan object, according to embodiments of the present disclosure.
Figure 11:
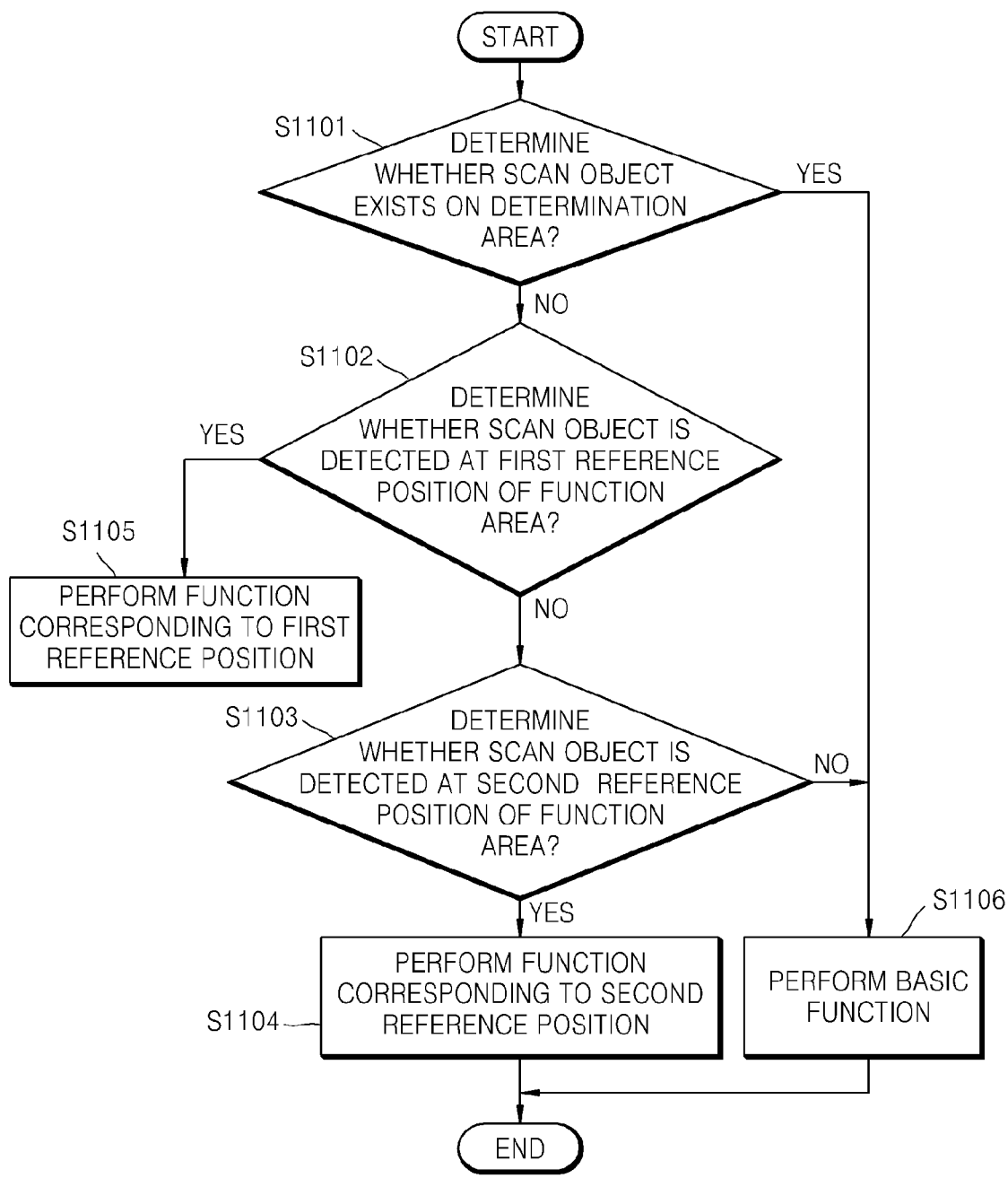

FIGS. 10 and 11 are flowcharts illustrating methods of performing a function according to a position of a scan object, according to embodiments of the present disclosure. When the scan object exists on the scan area, a function according to a position of the scan object on the scan area may be performed. The methods will now be explained with reference to FIGS. 10 and 11. However, a method of performing each step has already been explained, and thus a detailed explanation thereof will not be given.

Referring to FIG. 10, in operation S1001, it is determined whether a scan object exists on a determination area of a scan area of an image forming apparatus. When it is determined in operation S1001 that the scan object exists on the determination area, the method proceeds to operation S1004. In operation S1004, a basic function of the image forming apparatus is performed. However, when it is determined in operation S1001 that the scan object does not exists on the determination area, the method proceeds to operation S1002. In operation S1002, a position of the scan object on a function area is determined. When the position of the scan object on the function area is determined in operation S1002, the method proceeds to operation S1003. In operation S1003, a function corresponding to the determined position is performed.

Referring to FIG. 11, in operation S1101, it is determined whether a scan object exists on a determination area of a scan area of an image forming apparatus. When it is determined in operation S1101 that the scan object exists on the determination area, the method proceeds to operation S1106. In operation S1106, a basic function of the image forming apparatus is performed. However, when it is determined in operation S1101 that the scan object does not exist on the determination area, the method proceeds to operation S1102. In operation S1102, it is determined whether the scan object is detected at a first reference position on a function area. When it is determined in operation S1102 that the scan object is not detected at the first reference position, the method proceeds to operation S1103. When it is determined in operation S1102 that the scan object is detected at the first reference position, it is determined that the scan object is located at the first reference position. In operation S1105, a function corresponding to the first reference position is performed.

When it is determined in operation S1102 that the scan object is not detected at the first reference position of the function area, the method proceeds to operation S1103. In operation S1103, it is determined whether the scan object is detected at a second reference position of the function area. When it is determined in operation S1103 that the scan object is not detected at the second reference position, the method proceeds to operation S1106. In operation S1106, the basic function of the image forming apparatus is performed. When it is determined in operation S1103 that the scan object is detected at the second reference position, it is determined that the scan object is located at the second reference position. In operation S1104, a function corresponding to the second reference position is performed. Although in FIG. 11, as a non-limiting example, only the first and second reference positions of the function area are used to describe the method of performing a function, the present disclosure is not limited thereto. For example, the method may include one or more reference positions and corresponding functions.

As such, a scan area is divided into a determination area and a function area, and when a scan object does not exist on the determination area, a position of the scan object on the function area is determined and a function preset to correspond to the determined position is performed, thereby making it possible to perform various functions with simple manipulation.

As described above, since a scan area on which a scan object is disposed is divided into a determination area and a function area, a position of the scan object on the function area is determined, and a function corresponding to the determined position is performed, various functions may be conveniently performed without connection to a peripheral device.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks, DVDs and Blu-rays; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While the present disclosure has been particularly shown and described with reference to exemplary embodiments thereof by using specific terms, the embodiments and terms have merely been used to explain the present disclosure and should not be construed as limiting the scope of the present disclosure as defined by the claims. The exemplary embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. An image forming apparatus comprising:
   a user interface unit that comprises a scan area on which a scan object is disposed;
   an image reading unit that reads an image of the scan object disposed on the scan area;
   a driving unit that moves the image reading unit on the scan area;
   an operation performing unit that performs an operation by using the image read by the image reading unit; and
   a control unit that controls the operation to be performed according to a position of the scan object on the scan area,
   wherein
   the scan area comprises a determination area and a function area, the control unit determines whether the scan object exists on the determination area and when it is determined that the scan object exists on any position of the determination area, controls the operation performing unit to store or print the read image, and when it is determined that the scan object does not exist on the determination area, perform a function which is preset according to a position of the scan object on the function area,
   wherein the determination area extends from a first position to a second position on the scan area, and the function area extends from the second position to a third position on the scan area.

2. The image forming apparatus of claim 1, wherein the control unit comprises:
   a position determining unit that determines a position of the scan object on the function area; and
   a function selecting unit that selects a function corresponding to the determined position.

3. The image forming apparatus of claim 2, wherein the position determining unit determines a position of the scan object by receiving an electrical signal corresponding to the read image from the image reading unit and analyzing the received electrical signal in predetermined cycles.

4. The image forming apparatus of claim 2, wherein each of one or more reference positions existing on the function area correspond to a predetermined function,
   wherein the function selecting unit determines whether the determined position of the scan object is located at any one of the one or more reference positions and selects a function corresponding to the one or more reference positions.

5. The image forming apparatus of claim 4, wherein the one or more reference positions are displayed by using any one of methods of making engraving, printing text, and attaching a sticker.

6. The image forming apparatus of claim 4, wherein the function corresponding to each of the one or more reference positions is changeable.

7. The image forming apparatus of claim 1,
   wherein the control unit determines whether the scan object exists on the determination area by controlling the driving unit to move the image reading unit from the first position to the second position, and when it is determined that the scan object does not exist, the control unit determines a position of the scan object on the function area by controlling the driving unit to move the image reading unit from the third position to the second position.

8. The image forming apparatus of claim 7, wherein when it is determined that scan object does not exist on the determination area, the control unit controls the driving unit to move the image reading unit from the second position to the third position while turning off the image reading unit and then to move the image reading unit from the third position to the second position while turning on the image reading unit.

9. The image forming apparatus of claim 8, wherein the control unit controls the driving unit to make a speed at which the image reading unit is moved from the second position to the third position higher than a speed at which the image reading unit is moved from the first position to the second position.

10. A method of performing a function according to a position of a scan object, the method comprising:
determining whether the scan object exists on a determination area of a scan area;
when it is determined that the scan object exists on any position of the determination area, reading and storing or printing an image of the scan object, and when it is determined that the scan object does not exist on the determination area, determining a position of the scan object on a function area of the scan area; and
performing a function which is preset according to the determined position on the function area,
wherein the determination area extends from a first position to a second position on the scan area, and the function area extends from the second position to a third position on the scan area.

11. The method of claim 10, wherein the determining of the position comprises:
receiving an electrical signal corresponding to the image read from the scan object; and
determining a position of the scan object by analyzing the electrical signal in predetermined cycles.

12. The method of claim 10, wherein each of one or more reference positions existing on the function area correspond to a predetermined function,
wherein the determining of the position comprises determining whether a position of the scan object is located at any one of the one or more reference positions.

13. The method of claim 12, wherein the one or more reference positions are displayed by using to any one of methods of making engraving, printing text, and attaching a sticker.

14. The method of claim 12, wherein the function corresponding to each of the one or more reference positions is changeable.

15. The method of claim 10,
wherein the determining whether the scan object exists on the determination area comprises determining whether the scan object exists on the determination area by moving an image reading unit from the first position to the second position,
wherein the determining of the position of the scan object comprises determining the position of the scan object on the function area by moving the image reading unit from the third position to the second position.

16. The method of claim 15, wherein when it is determined that the scan object does not exist on the determination area, the determining of the position of the scan object comprises moving the image reading unit from the second position to the third position while turning off the image reading unit and then moving the image reading unit from the third position to the second position while turning on the image reading unit.

17. The method of claim 16, wherein a speed at which the image reading unit is moved from the second position to the third position is higher than a speed at which the image reading unit is moved from the first position to the second position.

18. A non-transitory computer-readable recording medium having embodied thereon a program to execute the method of claim 10.

19. An image forming apparatus comprising:
a user interface unit that includes a scan area on which a scan object is disposed;
an image reading unit that reads an image of the scan object disposed on the scan area;
a driving unit that moves the image reading unit on the scan area; and
a controller that controls an operation to be performed according to a position of the scan object,
wherein:
the controller controls the driving unit to move the image reading unit from an initial position corresponding to a first end of the scan area to a first position and determines whether the scan object is detected based on a first image read by the image reading unit when the image reading unit is moved from the initial position to the first position,
if the controller determines the scan object is detected based on the first image, the controller performs a first predetermined function,
if the controller determines the scan object is not detected based on the first image, the controller controls the driving unit to move the image reading unit from the first position to a first reference position and determines whether the scan object is detected at the first reference position based on a second image read by the image reading unit, and
if the controller determines the scan object is detected based on the second image, the controller performs a second predetermined function.

20. The image forming apparatus of claim 19, wherein the controller comprises:
a position determining unit that determines the position of the scan object on the scan area; and
a function selecting unit that selects a function corresponding to the determined position.

21. The image forming apparatus of claim 19, wherein the scan area includes a first area which is a portion of the scan area from the first reference position to a second reference position, a second area which is a portion of the scan area from the second reference position to a third reference position, and a third area which is a portion of the scan area from the third reference position to a fourth reference position,
the first, second and third reference positions correspond to a predetermined function, and
the controller determines whether the scan object is detected at one of the first, second and third areas, and if the scan object is detected at one of the first, second, and third areas, the controller performs the predetermined function corresponding to one of the first, second, and third reference positions.

22. A method of performing a function according to a position of a scan object, the method comprising:
determining whether the scan object exists on a scan area;

determining a position of the scan object with respect to a first end of the scan area; and performing a predetermined function according to the determined position on the scan area, wherein determining the position of the scan object comprises:

moving an image reading unit from an initial position corresponding to a first end of the scan area to a first position and determining whether the scan object is detected based on a first image read by the image reading unit when the image reading unit is moved from the initial position to the first position, if the scan object is detected based on the first image, performing a first predetermined function, if the scan object is not detected based on the first image, moving the image reading unit from the first position to a first reference position and determining whether the scan object is detected at the first reference position based on a second image read by the image reading unit, and if the scan object is detected based on the second image, performing a second predetermined function.

23. The method of claim 22, wherein the scan area includes a first area which is a portion of the scan area from the first reference position to a second reference position, a second area which is a portion of the scan area from the second reference position to a third reference position, and a third area which is a portion of the scan area from the third reference position to a fourth reference position, the first, second and third reference positions correspond to a predetermined function, and determining the position of the scan object further comprises determining whether the scan object is detected at one of the first, second and third areas, and performing the predetermined function comprises if the scan object is detected at one of the first, second, and third areas, performing the predetermined function corresponding to one of the first, second, and third reference positions.

24. A method of performing a function according to a position of a scan object, the method comprising:

determining whether the scan object exists on a determination area of a scan area;

when it is determined that the scan object exists on the determination area, reading and storing or printing an image of the scan object, and when it is determined that the scan object does not exist on the determination area, determining a position of the scan object on a function area of the scan area; and performing a function which is preset according to the determined position on the function area, wherein:

determining whether the scan object exists on the determination area of the scan area comprises analyzing a first image read by an image reading unit which is moved in a first direction through the determination area; and determining the position of the scan object on the function area of the scan area comprises analyzing a second image read by the image reading unit which is moved in a second direction through at least a portion of the function area, the second direction being opposite to the first direction.

25. A method of performing a function according to a position of a scan object on a scan area comprising a determination area and a function area, the method comprising:

determining whether the scan object exists on the determination area using an image obtained by an image reading unit which is moved in a first direction through the determination area;

when the scan object does not exist on the determination area, determining whether the scan object exists on the function area using an image obtained by the image reading unit which is moved in a second direction through at least a portion of the function area, the second direction being opposite of the first direction;

when it is determined that the scan object exists on the determination area, performing a first function with respect to the scan object; and when it is determined that the scan object exists on the function area, performing a second function with respect to the scan object.

* * * * *